March 1, 1960 R. J. FLYNN 2,926,375
WIPER BLADE
Filed Sept. 10, 1956
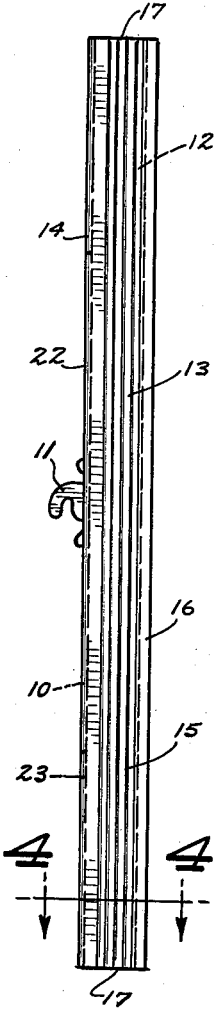
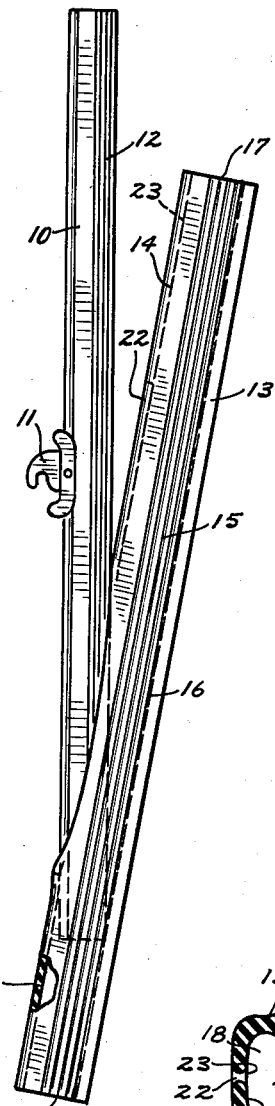
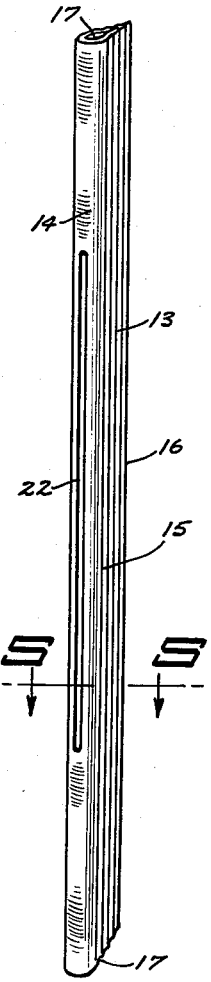
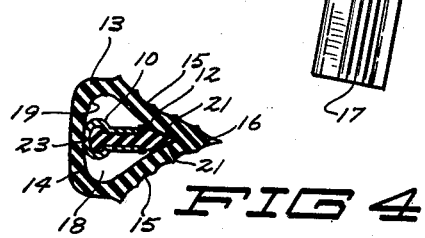
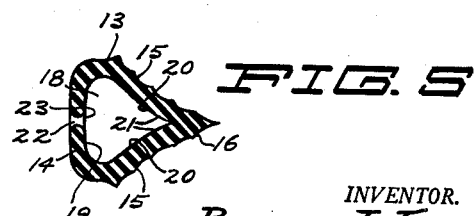
INVENTOR.
RICHARD J. FLYNN
BY
Braddock and Braddock
ATTORNEYS

United States Patent Office 2,926,375
Patented Mar. 1, 1960

2,926,375
WIPER BLADE
Richard J. Flynn, St. Paul, Minn.
Application September 10, 1956, Serial No. 608,772
1 Claim. (Cl. 15—250.38)

The invention herein has relation to wiper blades of character to be detachably associated with wiper assemblies of various types and devised to be especially useful for employment in connection with windshield wipers as replacements for wiper elements thereof which have become spent or worn out and thus incapable of efficiently performing their intended service or function.

In the accompanying drawing forming a part of this specification,

Fig. 1 is an elevational view of a wiper blade made according to the invention as when applied to a windshield wiper in replacement of a wiper element thereof;

Fig. 2 is an elevational view disclosing the wiper blade as when being assembled with the windshield wiper of Fig. 1;

Fig. 3 is a perspective view of the wiper blade as when disassembled from the windshield wiper;

Fig. 4 is a detail sectional view, taken on the line 4—4 in Fig. 1; and

Fig. 5 is a detail sectional view, taken on line 5—5 in Fig. 3.

Windshield wipers heretofore known have been of several different constructions, but each has included an elongated holder, such as 10, an attaching element, such as 11, for connecting the windshield wiper to an actuating shaft therefor, and an elongated wiper element, such as 12, retained in the holder at a location opposite the attaching element. In the disclosure as made, the elongated holder 10 is constituted as a length of rigid material of general U-shape in cross section, the attaching element 11 is situated at the midlength of said elongated holder, the elongated wiper element 12 is retained within the elongated holder to project therefrom in direction away from said attaching element, said elongated holder and elongated wiper element are parallel, the windshield wiper is of uniform width and of thickness much less than its width, opposite ends, respectively, of the elongated holder and elongated wiper element terminate flush with each other and extend transversely of the windshield wiper.

The new and improved wiper blade, denoted generally at 13, has been devised to be capable of readily and easily receiving the elongated holder and wiper element of a windshield wiper when to serve as a wiping instrumentality in replacement of a spent or worn out wiper element of said windshield wiper.

The wiper blade 13 consists of a piece of stretchable material, such, for example, as rubber, a rubberized product, etc., capable of functioning as a squeegee, so-called. An elongated base member or wall 14 of the wiper blade, of uniform width and thickness, extends the full length thereof, as do also elongated opposite side members or walls, each indicated 15, of said wiper blade. The elongated opposite side members or walls 15 are contiguous with the opposite side edges of the elongated base member or wall 14 at one side thereof and converge to meet at an elongated apex 16 of the wiper blade constituting an elongated edge portion thereof opposite said elongated base member or wall. The elongated opposite side members or walls 15 are of equal width and of thickness much less than width. The elongated apex or edge portion 16 is in spaced, parallel relation to the elongated base member or wall 14, as well as in a plane passed perpendicularly and longitudinally through said elongated base member or wall, and said elongated apex or edge portion extends the full length of the wiper blade. Opposite end members or walls, each represented 17, of said wiper blade are integral with the opposite ends, respectively, of the elongated base member or wall 14 and the elongated opposite side members or walls 15.

An interior space 18 of the wiper blade is bounded at a location thereof adjacent the elongated base member or wall 14 by an internal surface 19 of said elongated base member or wall, at locations thereof adjacent the elongated opposite side members or walls 15 by internal surfaces, each denoted 20, of said elongated opposite side members or walls, at a location thereof adjacent the elongated apex or edge portion 16 by converging internal surfaces 21 of said elongated apex or edge portion, and at the opposite ends thereof by internal surfaces of the opposite end members or walls 17.

A longitudinal slit 22 through the elongated base member or wall 14, for receiving the elongated holder and wiper element of a windshield wiper, is disposed centrally of said elongated base member or wall, and the opposite ends of said longitudinal slit terminate in equally spaced relation to the opposite end members or walls 17 of the wiper blade. Longitudinally extending internal surfaces of portions of the elongated base member or wall 14 disposed between the longitudinal slit 22 and the opposite end members or walls 17, respectively, providing shoulders for retaining a windshield wiper within the new and improved wiper blade, are indicated at 23.

The wiper blade of the invention when unstretched will be shorter than are the elongated holder and wiper element of a windshield wiper to be inserted into said wiper blade. Also, the construction and arrangement will be such that when a windshield wiper is situated in the wiper blade, interior surfaces or shoulders, such as 23, of the elongated base member or wall, such as 14, of said wiper blade will be contiguous with surfaces of the elongated holder of said windshield wiper opposite the wiper element thereof and an edge portion of said elongated wiper element opposite the elongated holder will lie between converging internal surfaces, such as 21, in contiguous relation to the elongated apex or edge portion, such as 16, of the wiper blade, while internal surfaces, such as 20, of elongated opposite side members or walls, such as 15, of said wiper blade are in adjacent relation to opposite side surfaces of the windshield wiper, all as will be apparent from the disclosure of the drawing. When a windshield wiper is to be inserted into the wiper blade one end portion of said windshield wiper will be inserted through the longitudinal slot, such as 21, into a first end portion of said wiper blade, as in Fig. 2, said wiper blade will then be longitudinally stretched while the other end portion of the windshield wiper is being situated within a second end portion of the wiper blade, and, finally, the wiper blade will be released to become unstretched to cause the opposite end members or walls, such as 17, thereof to engage against the opposite ends of said windshield wiper.

A wiper blade made according to the invention can be of construction to be fitted upon windshield wipers of character employed to clean curved windshields, and the wiper blade obviously can be applied to windshield wipers of different sizes.

What is claimed is:

A wiper blade for employment in connection with a windshield wiper in replacement of an elongated wiper element thereof retained in a rigid elongated holder of the windshield wiper, said elongated holder and wiper element together constituting a unit of said windshield wiper including an elongated rearward edge portion provided by the elongated holder and an elongated forward edge portion, in the plane of and in spaced, parallel relation to said rearward edge portion, provided by the elongated wiper element, comprising a longitudinally stretchable hollow member normally of length less than that of said unit constituted as an elongated base member, an elongated apex in spaced, parallel relation to said elongated base member, opposite side members between opposite side edges, respectively, of the elongated base member and said elongated apex and opposite end members between opposite ends, respectively, of said opposite side members, said elongated base member, elongated apex and opposite side and end members bounding an interior space of said wiper blade for reception of said unit and there being a longitudinal slit through a portion of the elongated base member between and in spaced relation to said opposite end members for entry of the unit into said interior space, said elongated base member providing internal surfaces between opposite ends of said elongated slit and said opposite end members, respectively, to be engaged against said rearward edge portion of said unit, said opposite side members providing converging internal surfaces spaced from the elongated base member and adjacent to said elongated apex to be engaged against said forward edge portion of the unit and said opposite end members providing internal surfaces to be resiliently engaged against opposite ends, respectively, of the elongated holder of said unit when situated within said interior space of said wiper blade.

References Cited in the file of this patent

UNITED STATES PATENTS

| | | |
|---|---|---|
| 1,925,697 | Johnson | Sept. 5, 1933 |
| 2,712,146 | Wise | July 5, 1955 |
| 2,728,100 | Oishei | Dec. 27, 1955 |

FOREIGN PATENTS

| | | |
|---|---|---|
| 619,320 | Great Britain | Mar. 8, 1949 |